SCR 1 TRIGGER  SCR 2 TRIGGER

INVENTOR
FREDERICK A. STICH
BY Bernard E. Franz
ATTY.

United States Patent Office 3,377,538
Patented Apr. 9, 1968

3,377,538
REGULATED CONVERTER
Frederick A. Stich, Addison, Ill., assignor to Automatic Electric Laboratories, Inc., Northlake, Ill., a corporation of Delaware
Filed Mar. 7, 1966, Ser. No. 532,222
11 Claims. (Cl. 321—2)

This invention relates to power supplies and particularly to a high efficiency switching type power supply utilizing magnetic voltage and current controls.

In many applications it is important that a direct current at a voltage other than that of the main supply voltage be available. The power supply for the electronic equipment of a telephone exchange is such an example. The telephone exchange is normally equipped with a 48 volt direct-current supply for the electromechanical equipment, while the electronic circuits require entirely different voltage levels. Other applications for this type of direct current voltage conversion include shipboard and military use where current limiting and light weight are added requirements.

Accordingly, an object of this invention is to provide an improved inverter circuit which will supply a high frequency of approximately 10,000 cycles per second alternating voltage to a rectifier circuit the output of which is to remain at a substantially constant level as load requirements vary.

It is still a further object of this invention to provide an improved inverter circuit having a pair of silicon controlled rectifiers in which one of the controlled rectifiers is prevented from firing while the other controlled rectifier is conducting.

Briefly, the power supply in accordance with this invention includes a pair of serially connected capacitors and a pair of serially connected controlled rectifiers connected across a pair of direct current input terminals to operate as a high frequency switching circuit supplying alternating current to a transformer. The use of a very high switching frequency permits the use of transformers and chokes with less iron and, of course, considerably less weight. The transformer output is then rectified, filtered and supplied to the load. A free-running blocking oscillator is coupled to a binary firing circuit for the pair of controlled rectifiers. The oscillator is prevented from generating a pulse during the interval that either one of the controlled rectifiers is conducting by the use of a biasing means connected directly to the outputs of the controlled rectifiers. The output path of the binary firing circuit is completed through a pair of saturable reactors to control the voltage and limit the current at the output, by controlling the repetition rate of the controlled rectifier.

The novel features of this invention, as well as the invention and method of operation, will best be understood from the accompanying description taken in connection with the accompanying drawings, wherein FIG. 1 and FIG. 2 when placed together, with FIG. 1 on the left, is a schematic circuit diagram of a power supply in which the invention is embodied.

DETAILED DESCRIPTION

Figure 1:
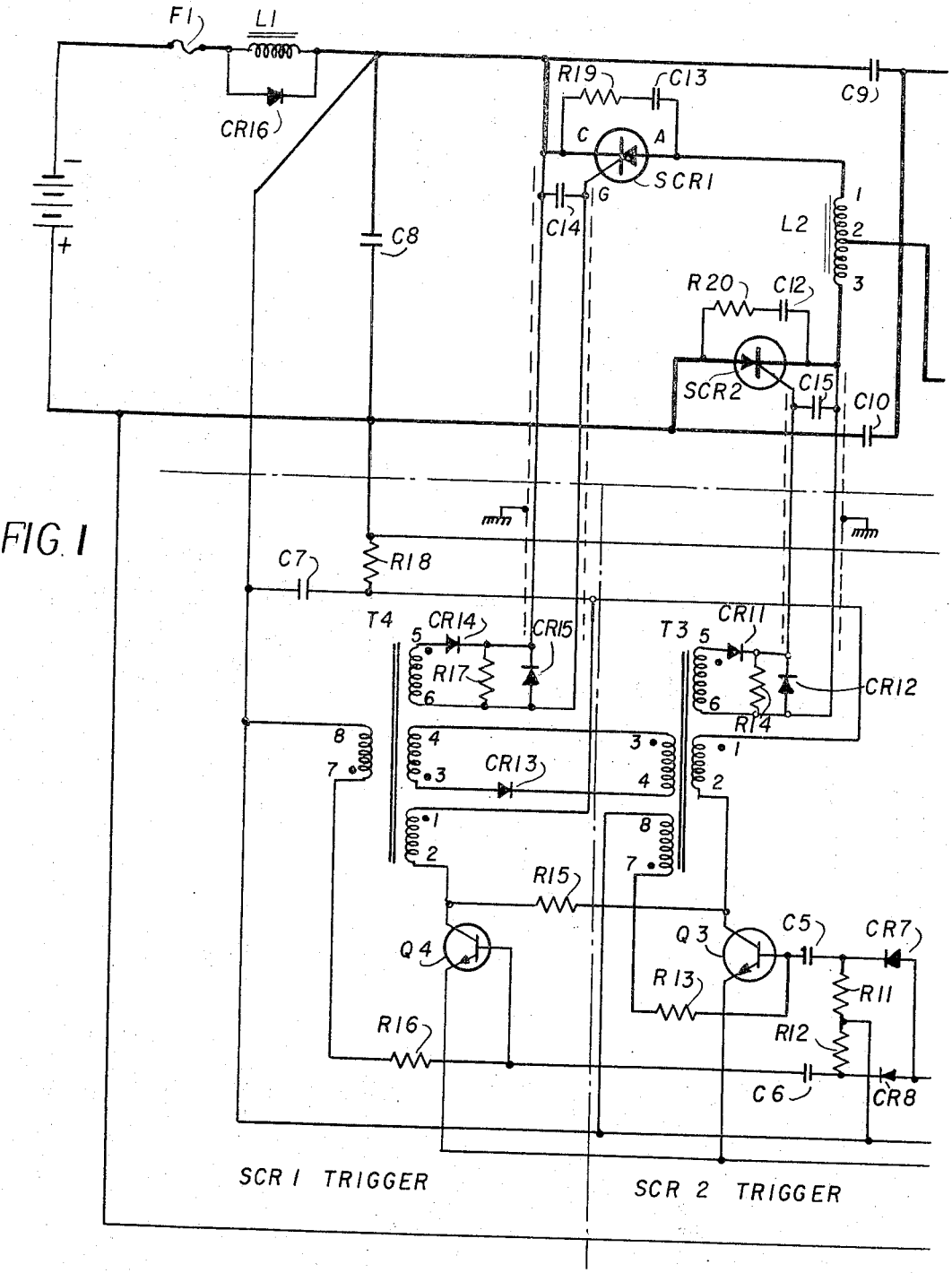
Figure 2:
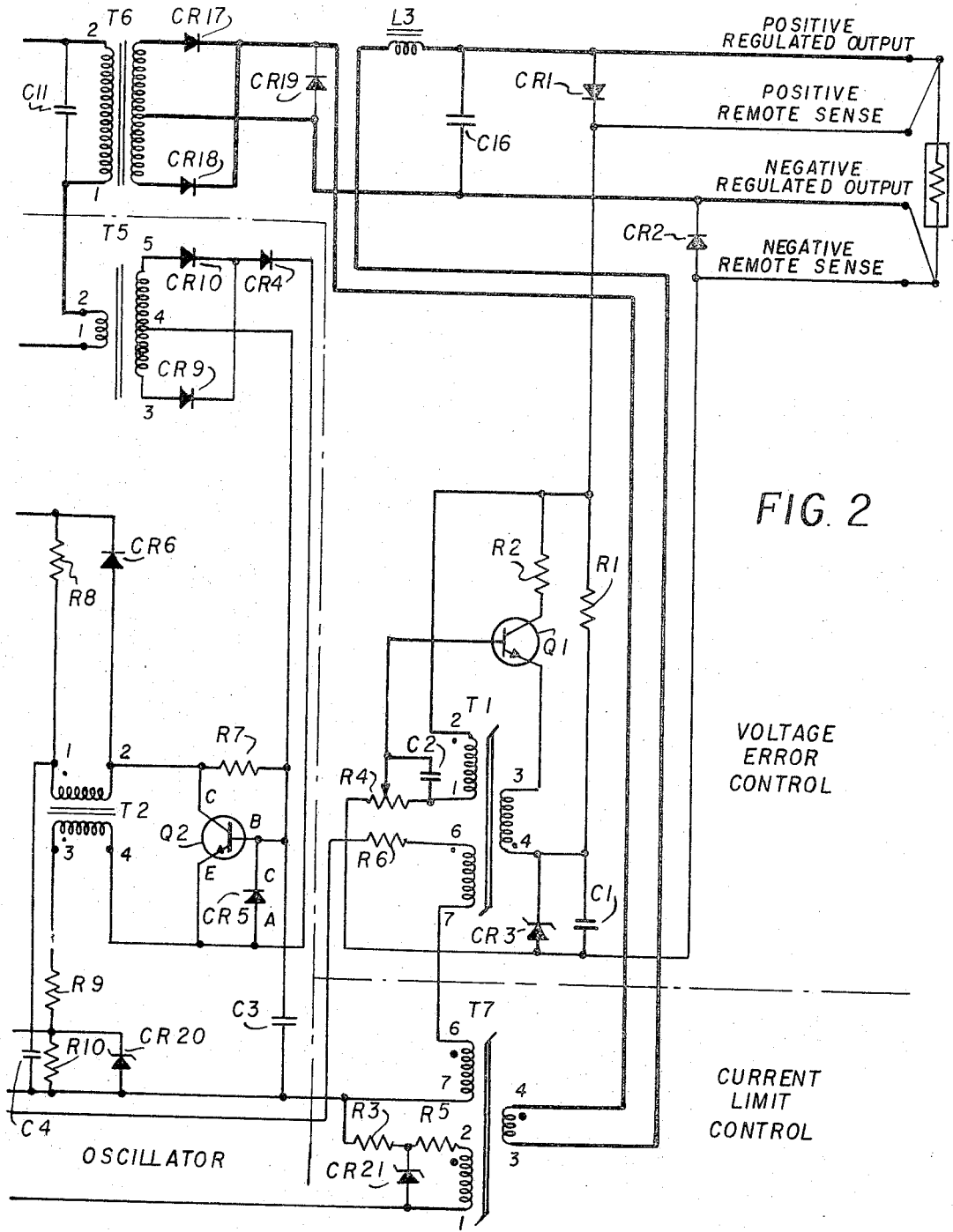

Referring to the FIGS. 1 and 2, showing the regulated converter power circuit, the power switching elements of the converter are silicon controlled rectifiers, SCR1 and SCR2. The silicon controlled rectifier is a four-layer p-n-p-n semiconductor device having three electrodes: anode, cathode and gate. The SCR has a reverse blocking characteristic similar to the conventional single-junction rectifier, but, unlike the conventional rectifier, it has a controllable forward blocking characteristic. In the forward-biased direction, a voltage applied to the gate, which is positive with respect to the cathode will cause conduction from the anode to the cathode. Upon removal of the gate signal, the SCR will remain in conduction due to intrinsic regeneration. Conduction can only be halted by reverse biasing or interruption of the anode-cathode circuit.

If SCR1 is placed in conduction by the application of a positive gate pulse, a sinusoidal current will flow through the primary winding of transformer T6 due to the resonance of inductor L2 and capacitor C10. After a half-cycle has been completed, the current will reverse through SCR1, turning it off and capacitor C10 will remain charged at a voltage somewhat higher than the battery input voltage. At this point, SCR2 may be placed in conduction and a sinusoidal current of opposite phase will flow through the primary of transformer T6 due to the resonance of inductor L2 with capacitor C10 which is discharged and capacitor C9 which is charged. As before, the current will reverse after a half-cycle and turn off SCR2. At this point, SCR1 may be turned on and the circuit action continues as previously described with the exception that a charge exists on capacitor C9 initially in this half-cycle. The alternate triggering of the SCR's will produce opposite phase half-cycles across the primary of transformer T6. If the triggering frequency is close to the resonant frequency of the switching circuit, a low distortion sine wave will be produced. If the triggering frequency is less than the resonant frequency, a pause period will appear between alternate half sinusoids. The essential regulation means in this converter is the ability to control the length of the pause period.

The output of transformer T6 is rectified by diodes CR17 and CR18 and filtered by inductor L3 and capacitor C16 to produce a low ripple DC output. The "free wheeling diode" CR19 provides a return path for L3 during the non-conducting periods of rectifiers CR17 and CR18. Capacitor C11 provides a current path during light loads so that the SCR commutation will not be hampered. Two R-C networks consisting of R19 and C13, and R20 and C12, respectively connected in shunt with SCR1 and SCR2, are provided to squelch ringing caused by the abrupt cessation of commutating currents. Otherwise, this ringing could cause false firing of the SCR's. Capacitors C14 and C15 connected between the gate and cathode terminals of SCR1 and SCR2 respectively, prevent noise spikes from falsely triggering the SCR's, and capacitor C8 provides a stiffer voltage source for the operation of this converter. Inductor L1 serves to filter any transients from being transmitted back to the supply source; it is shunted by a free wheeling diode CR16. Fuse F1 serves to limit the input current to a safe value.

As shown in the drawings, the regulated converter control circuit can be divided into the following functional parts: a control circuit supply, a blocking oscillator with current synchronization, a voltage error control, a current regulating control, and the two trigger circuits for SCR1 and SCR2.

BLOCKING OSCILLATOR WITH CURRENT SYNCHRONIZATION

The blocking oscillator, of which transistor Q2 is the active element, is of conventional form except for the current synchronization circuitry. When the base-emitter junction of transistor Q2 becomes slightly forward biased by the exponentially increasing voltage on capacitor C3, the resulting flow of collector current will be transformed into a regenerative current flowing through winding 3–4 of transformer T2. This action produces a pulse which is initiated by the rising base voltage formed by the R-C combination of R7 and C3 and is terminated by the decreasing instantaneous primary reactance of transformer T2. The heart of the current synchronization circuit is the current transformer T5. The current through the primary winding 1-2 of T5 is almost identical to that flowing in the conducting SCR. The induced current in the secondary winding 3-4-5 of T5 is rectified by the full wave rectifiers CR9 and CR10. The presence of the DC voltage indicates that one of the SCR's is in the conducting state. This voltage inhibits the blocking oscillator by reverse biasing the transistor Q2 so that the pulse to initiate the conduction of the other SCR will not appear until the first conductive period is completed. Shortly after the disappearance of this voltage, the blocking oscillator returns to its conventional mode of operation, that of a free-running pulse generator.

Diode CR5 with its cathode connected to the base of transistor Q2 and its anode to the emitter of Q2 protects the base-emitter junction of transistor Q2 from excessive reverse-biasing potentials and diode CR4 is used as a stabistor to prevent the normal forward-biasing potential of Q2 from being shorted by the secondary 3-4-5 of current transformer T5. A stabistor is a semiconductor used as a low level voltage regulating device which provides a constant voltage drop over a wide current range in the forward direction. Diode CR20 shunting resistor R10 in the emitter path of Q2 serves as a "clipper" to limit the level of the output of Q2 to a fixed value.

VOLTAGE REGULATION

The output pulse from the blocking oscillator is coupled through resistor R9, diodes CR7 and CR8, capacitors C5 and C6 and transistors Q3 and Q4 respectively and then to the windings 7-6 of saturable transformers T7 and T1. Transformer T1 with transistor Q1 comprise the voltage sensing circuit.

If the output voltage of the converter is below normal, the ampere-turn relationships in windings 1-2 and 3-4 will be such that the direction of saturation of the core will present a low impedance path through winding 6-7, thus permitting the passage of the pulse through the pulse steering binary circuit.

The positive and negative remote sense leads directly from the load terminals are connected across the circuit comprised of resistor R2, collector-emitter of transistor Q1, winding 3-4 of transformer T1 and zener diode CR3 shunted by C1 for a first path and through winding 2-1 of transformer T1 and resistor R4 for a second path from the positive to the negative remote sense leads. An adjustable voltage is selected from across resistor R4 and is applied to the base of transistor Q1. Transformer windings 2-1 and 3-4 are poled to oppose each other. Zener diode CR3 provides a constant reference level for the base-emitter junction of Q1.

This configuration results in a form of differential amplifier, where when the voltage across the sense leads is of the proper value, then the voltage applied to the base of Q1 is set so that the current through winding 3-4 is equal to that through winding 1-2 of T-1. Thus for a lower than normal voltage across the sense leads, and this circuit, the base will appear more negative to cause a correspondingly decreased current flow through winding 3-4, in the collector-emitter path.

For an increased voltage across this circuit the base will appear more positive to cause a correspondingly increased current flow through winding 3-4 to saturate the core in a direction to present an increased impedance to the pulses through winding 6-7.

During normal operation, the current through winding 2-1 multiplied by the number of turns is equal to the current through winding 3-4 multiplied by the number of turns. A change in the current through either winding will shift the relative degree of saturation to either present a lesser impedance for a lower voltage or a higher impedance for a higher voltage.

CURRENT REGULATION

Saturable transformer T1 functions as a voltage regulating control element and saturable transformer T7 as a current regulating element. For load currents below a preset level, winding 6-7 of T7 is a short circuit by virtue of the bias conditions on windings 3-4 and 1-2. The regulated converter would be operating as a voltage regulator for these conditions. The entire output of the converter is taken through winding 4-3, while the current through winding 2-1 is maintained at a constant value by the network consisting of zener diode CR21 and resistors R3 and R5. Within the preset current operating range, winding 2-1 maintains the core of T7 in such a direction of saturation that a low impedance is presented to the pulses through winding 6-7. If the output current should increase to a point such that the ratio of the ampere-turns $1-2$ $I_{Output}$ is greater than the ampere-turns $3-4$ $I_{3-4}$, winding 6-7 will appear to the control circuit as a large impedance. Since no trigger pulse can be passed during this time, the output current cannot increase further and must remain within the preset bound. A decrease in the load resistance will result in a decrease in output voltage such that the output current remains constant. A limiting point is reached when the load resistance is zero and the output voltage is zero, but the output current remains at its preset value.

TRIGGER CIRCUITS

Pulses appearing on winding 3-4 of transformer T2 are delivered to the anodes of diodes CR7 and CR8, through the diodes and resistors R11 and R12 to negative battery. These pulses are also applied to the bases of transistors Q3 and Q4 through capacitors C5 and C6.

Transistors Q3 and Q4 with their corresponding pulse transformers T3 and T4 each operate similarly to a blocking oscillator, in that an input pulse appearing at the base of the transistor causes the transistor to conduct and a voltage to be induced in the primary winding 1-2 of the transformers. The winding 7-8 is arranged to add to the base drive of the respective transistors and sustain conduction. Eventually, capacitor C7 shared by transistors Q3 and Q4 would be discharged and the magnetic field of the respective transformer T3 of T4 would collapse, ending the pulse.

Transformers T3 and T4 are coupled together by means of the series connection of windings 3-4 of each and diode CR13 to prevent both transistors Q3 and Q4 from conducting simultaneously. When, for example, Q3 is conducting, Q4 is prevented from conducting by the induced current in winding 3-4 of T4 to induce a negative voltage in winding 7-8 to the base of Q4.

The succeeding pulse from the oscillator applied to the bases of Q3 and Q4 will find transformer T3 saturated due to the previous conduction of Q3, and transformer T4 unsaturated due to the previous action of windings 3-4 and diode CR13. These conditions will enable Q4 to sustain conduction after triggering and Q3 to remain nonconducting due to lack of regeneration in saturated T3 and also to the reverse biasing effected by windings 3-4 and diode CR13. The reverse biasing will also return transformer T3 to the unsaturated state so that Q3 may conduct for the next trigger pulse. This binary action will then continue, with succeeding pulses alternately bringing Q3 and Q4 into conduction, modified only by the voltage and current control impedances of T1 and T7 which are in the emitter paths of both Q3 and Q4.

The output windings 5-6 of transformers T3 and T4 are coupled to the gate and cathode of each of the silicon controlled rectifiers SCR2 and SCR1 respectively. The diodes CR11 and CR14 insure unidirectionality of the firing pulses, while diodes CR12 and CR15 insure the unidirectional property of the pulses by clamping any backswings.

From the foregoing description it should now be apparent that the present invention provides an improved power supply employing silicon controlled rectifiers operating in a 10,000 cycle self resonant circuit as inverters and including a pair of saturable reactors connected to the output to perform as output voltage and current control elements, and also includes a novel interlock for the silicon controlled rectifiers to prevent their simultaneous firing. These features combined with the novel binary firing circuit and free running pulsing circuit controlled by the power pulses makes it possible to achieve fast acting regulation with a high degree of accuracy in a very simple light and reliable form. While a specific embodiment has been illustrated it will be understood that the invention is not so limited but may be extended to a broad class of similar circuits as defined in the appended claims.

What is claimed is:

1. A power supply for supplying a regulated direct current voltage to a pair of load terminals at a different value than that of a source of direct current comprising: a pair of controlled rectifiers connected in series with a center tapped inductor between said rectifiers and across said direct current source where said direct current source includes a first and a second terminal, a first transformer having a primary and a secondary winding, said primary winding having one terminal capacitively coupled to both terminals of said source and the other terminal connected to said inductor center tap, said secondary winding connected to a rectifier means to supply a DC current to a load, a first saturable reactor having a sense and a control winding, said sense winding of said saturable reactor connected across the load, an oscillator, a binary pulse dividing amplifier arranged to alternately fire each said controlled rectifier means to apply said oscillator output to said amplifier, and means including said control winding of said saturable reactor to block said binary amplifier output.

2. A power supply as claimed in claim 1 further including a second transformer having a primary and a secondary winding, said primary winding of said second transformer connected between said inductor center tap and a terminal of said first transformer, said secondary winding of said second transformer connected to rectifying circuit means, and means coupling the output of said rectifying means to said oscillator to block said oscillator during the conductive periods of said controlled rectifiers.

3. A power supply as claimed in claim 1 further including, an amplifier having an input terminal and a pair of output terminals, said output terminals in series with said sense winding and a resistor and connected across the load terminals, and said amplifier input terminal connected across one terminal of said load and the junction of said bias winding and a resistor.

4. A power supply as claimed in claim 1 wherein said binary pulse dividing amplifier comprises: first and second transistors each having emitter, collector and base electrodes, first and second transformers, each having first, second, third and fourth windings, means connecting the emitter electrode of each said transistor in series through the saturable reactor control winding to a first terminal of said source, and said collector electrode connected in series with said respective first windings to another terminal of said source, said transformers second windings connected in a series loop, said first and second transformer third windings respectively connected across said first and second controlled rectifiers cathode and gate electrodes, said transformers fourth windings connected between said first terminal of said source and said respective base electrodes of said transistors.

5. A power supply as claimed in claim 1 further including a second saturable reactor having a bias, an input and control winding, said bias winding connected across said direct current source, said input winding connected in series with said power supply output and said load terminals, said control winding connected in series between said binary amplifier and said first saturable reactor control winding, whereby an increase in output current beyond a preset value will block said binary amplifier.

6. A power supply as claimed in claim 3 further including a second transformer having a primary and a secondary winding, said second transformer primary winding connected between said inductor center tap and a terminal of said first transformer, said secondary winding of said second transformer connected to rectifying circuit means, and means coupling the output of said rectifying means to said oscillator to block said oscillator during the conductive periods of said controlled rectifiers.

7. A power supply as claimed in claim 4 further including, an amplifier having an input terminal and a pair of output terminals, said output terminals in series with said sense winding and a resistor and connected across the load terminals, and said amplifier input terminals connected across one terminal of said load and the junction of said bias winding and a resistor.

8. A power supply as claimed in claim 6 wherein said binary pulse dividing amplifier comprises: first and second transistors each having emitter, collector and base electrodes, first and second transformers, each having first, second, third and fourth windings, means connecting the emitter electrode of each said transistor in series through the saturable reactor control winding to a first terminal of said source, and said collector electrode connected in series with said respective first windings to another terminal of said source, said transformers second windings connected in a series loop, said first and second transformer third windings respectively connected across said first and second controlled rectifiers cathode and gate electrodes, said transformers fourth windings connected between said first terminal of said source and said respective base electrodes of said transistors.

9. A power supply for supplying a regulated direct current to a pair of load terminals at a different voltage value than that of the source of direct current comprising: a pair of controlled rectifiers connected in series with a center tapped inductor between said rectifiers and across said direct current source, where said direct current source includes first and second terminals, a first transformer having a primary and a secondary winding, said primary winding having one terminal capacitively coupled to both terminals of said source and the other terminal connected to said inductor center tap, said secondary winding connected to a rectifier means to supply a DC current to a load, a first saturable reactor having a sense, a bias and a control winding, said sense winding of said saturable reactor connected in series with a resistor across the load, an amplifier circuit having a pair of output terminals and a pair of input terminals, said output terminals connected in series with said sense winding and a zener diode and across said load and biased by a resistor, said input terminals connected across a terminal of said load and the junction of said bias winding and a resistor, an oscillator, and a binary pulse amplifier arranged to alternately fire each said controlled rectifier means to apply said oscillator output to said amplifier, and means including said amplifier circuit and said saturable reactor to control said control winding to block said binary amplifier output.

10. A power supply as claimed in claim 9 further including a second saturable reactor having a bias, an input and a control winding, said bias winding connected across said direct current source, said input winding connected in series with said power supply output and said load terminals, said control winding connected in series between said binary pulse dividing amplifier and said first saturable reactor control winding, whereby an increase in output current beyond a preset value will block said primary amplifier.

11. A power supply for supplying a regulated direct current to a pair of load terminals at a different voltage value than that of the source of direct current comprising: a pair of controlled rectifiers connected in series with a center tapped inductor between said rectifiers and across said direct current source where said direct current source includes first and second terminals, a first transformer having a primary and a secondary winding, said primary winding having one terminal capacitively coupled to both terminals of said source and the other terminal connected to said inductor center tap, said secondary winding connected to a rectifier means to supply a DC current to a load, a first saturable reactor having a sense, a bias and a control winding, said sense winding of said saturable reactor connected in series with a resistor across the load, an amplifier circuit having a pair of output terminals a pair of input terminals, said output terminals connected in series with said sense winding and a zener diode and across said load and biased by a resistor, said input terminals connected across a terminal of said load and the junction of said bias winding and a resistor, a blocking oscillator, a second saturable reactor having a bias, an input and a control winding, said bias winding connected across said direct current source, said input winding connected in series with said power supply output and said load terminals, said control winding connected in series between said binary amplifier and said first saturable reactor control winding, and a binary pulse dividing amplifier arranged to alternately fire each said controlled rectifier means to apply said blocking oscillator output to said amplifier, and means including said amplifier circuit and both said saturable reactors to control said respective control windings to block said binary amplifier output upon a rise in output voltage or current.

References Cited
UNITED STATES PATENTS

| | | | |
|---|---|---|---|
| 3,248,637 | 4/1966 | Albert et al. | 321—2 X |
| 3,263,152 | 7/1966 | Walker | 321—45 |
| 3,319,147 | 5/1967 | Mapham | 321—6 |

JOHN F. COUCH, *Primary Examiner.*

WARREN E. RAY, *Examiner.*

W. H. BEHA, JR., *Assistant Examiner.*